US006857036B2

(12) United States Patent
Lesartre (10) Patent No.: US 6,857,036 B2
(45) Date of Patent: Feb. 15, 2005

(54) HARDWARE METHOD FOR IMPLEMENTING ATOMIC SEMAPHORE OPERATIONS USING CODE MACROS

(75) Inventor: Gregg B. Lesartre, Fort Collins, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 491 days.

(21) Appl. No.: 09/907,072

(22) Filed: Jul. 17, 2001

(65) Prior Publication Data

US 2003/0018841 A1 Jan. 23, 2003

(51) Int. Cl.[7] .......................... G06F 12/00; G06F 12/14
(52) U.S. Cl. ...................................... 710/200; 710/262
(58) Field of Search ................................ 710/262, 200

(56) References Cited

U.S. PATENT DOCUMENTS

| | | | | |
|---|---|---|---|---|
| 5,440,746 A | * | 8/1995 | Lentz | 345/504 |
| 5,448,743 A | * | 9/1995 | Gulick et al. | 710/49 |
| 5,623,670 A | * | 4/1997 | Bohannon et al. | 710/200 |
| 5,623,676 A | * | 4/1997 | Horiguchi et al. | 710/262 |
| 5,937,199 A | * | 8/1999 | Temple | 710/262 |
| 6,000,029 A | * | 12/1999 | Moyer et al. | 712/244 |
| 6,018,785 A | * | 1/2000 | Wenniger | 710/200 |
| 6,081,867 A | * | 6/2000 | Cox | 710/264 |
| 6,237,089 B1 | * | 5/2001 | Moyer et al. | 712/244 |
| 6,360,243 B1 | * | 3/2002 | Lindsley et al. | 718/103 |
| 6,529,983 B1 | * | 3/2003 | Marshall et al. | 710/200 |
| 6,633,940 B1 | * | 10/2003 | Alasti et al. | 710/262 |
| 6,662,252 B1 | * | 12/2003 | Marshall et al. | 710/200 |

OTHER PUBLICATIONS

Cena, Gianluca, et al., "Efficient Implementation of Semaphores in Controller Area Networks," Apr. 1999, IEEE Transactions on Industrial Electronics, vol. 46, Issue 2, p. 417–428.*

Jacob, R.T., "Synthesis of Mutual Exclusion Solutions Based on Binary Semaphores," May 1989, IEEE Transactions on Software Engineering, vol. 15, Issue 5, p. 560–568.*

* cited by examiner

Primary Examiner—Mark H. Rinehart
Assistant Examiner—Donna K. Mason (57) ABSTRACT

A method is disclosed for handling interruptions, such as asynchronous interrupts, of a process using a system resource. The method determines whether a process is currently using a system resource. If a resource is being used and the system receives an interruption, then the method logs the interruption and delays accepting the interruption until after the process currently using the resource is completed. The method may be implemented in a system that controls access of processes to resources using semaphores that lock the resources while in use. The method determines whether a resource is currently in use by detecting a load and clear operation, indicating that a semaphore has locked the resource. The method delays acceptance of the interruption until either a branch command is executed, a store command is executed, a specified number of instructions are retired, or a specified number of clock cycles pass.

6 Claims, 7 Drawing Sheets

HARDWARE METHOD FOR IMPLEMENTING ATOMIC SEMAPHORE OPERATIONS USING CODE MACROS

FIELD OF INVENTION

The present invention relates generally to computer chip architecture. More particularly, it relates to a computer hardware method and system for processing semaphore operations.

BACKGROUND

In the field of computer chip architecture, it is desirable to efficiently use system resources. One way to improve efficiency is to share resources, such as processing and memory resources, among various operations. In a system having multiple processors or multiple processes semaphore operations are used to maximize resources. A semaphore is a permission to use a system resource, such as a location in memory, that may be "locked" by a process performed by the computer system. By locking the semaphore, the process has access to the system resources so long as it retains control of the semaphore. When a process is done using a resource, it releases the semaphore so that another process may use the resource. The use of a semaphore ensures that other system processes will not try to access the same system resource while it is being used by another process.

A semaphore operation reads, modifies, and writes a particular memory location during a single atomic operation. Example semaphore operations include load and clear, fetch and increment, fetch and decrement, and compare and swap. These semaphore operations may be implemented in hardware, but circuitry for operations other than load and clear are complicated. One implementation of semaphore operations implements only a load and clear operation in hardware to capture the semaphore, and implements the other operations in software macros built around the load and clear operation. This system is used, for example, in precision architecture reduced instruction set computing (PA-RISC) architecture. A process running on the system then performs its operation using a sequence of instructions and writes the result to the semaphore's location to release the semaphore. The load and clear operation writes its value to zero indicating that the semaphore is in use.

A problem arises when the semaphore operations are interrupted by a system interrupt. A process may be interrupted at any time during its operation. This creates a problem when the process is interrupted while it has locked a semaphore. The process may stall or appear to "go to sleep" for a long period of time, tying up the semaphore in the process. A semaphore may be a significant resource bottleneck in the system, and the interrupt may cause significant problems for other processes that want to access a semaphore. Careful coding is one means of attempting to resolve the interrupt problem, but it requires substantial time and does not address unscheduled, asynchronous interrupts. Synchronous interrupts are those interrupts that are expected to occur at certain, scheduled times relative to code execution. External, or asynchronous, interrupts or traps, such as input/output (I/O) driver interrupts present greater problems. In some instances, it is possible for asynchronous interrupts to interrupt a semaphore operation and tie up system resources. What is needed is a better method and system for processing semaphore operations.

SUMMARY OF INVENTION

A method is disclosed for handling interruptions of a semaphore operation, such as asynchronous interrupts or coherency requests. The method determines whether a process receiving the interruption has a semaphore for a system resource. If the process has locked a semaphore and the process receives an interruption, then the method logs the interruption and delays accepting the interruption until after the process currently using the resource is completed and the semaphore is released. The method may be implemented in a system that controls access of processes to resources using semaphores that lock the resources while in use. The method determines whether a resource is currently in use by detecting a load and clear operation, indicating that a semaphore has locked the resource. The method delays acceptance of the interruption until either a branch command is executed, a store command is executed, a specified number of instructions are retired, or a specified number of clock cycles pass.

A computer system is also disclosed having resources and processes that access the resources. Processes' access to the resources is controlled by a semaphore operation by which one of the processes has the semaphore at a given instance, and the semaphore entitles its owner to access of the resource. Semaphore interruptions, such as asynchronous interrupts or coherency requests, are received by the processes. If a process is currently using a resource, then that process logs the interruption and delays accepting the interruption until after the process completes its operation, if possible. In one embodiment, the interruption is delayed until either a branch command is executed, a store command is executed, a specified number of instructions retire, or a specified number of clock cycles pass.

DETAILED DESCRIPTION

Figure 1:
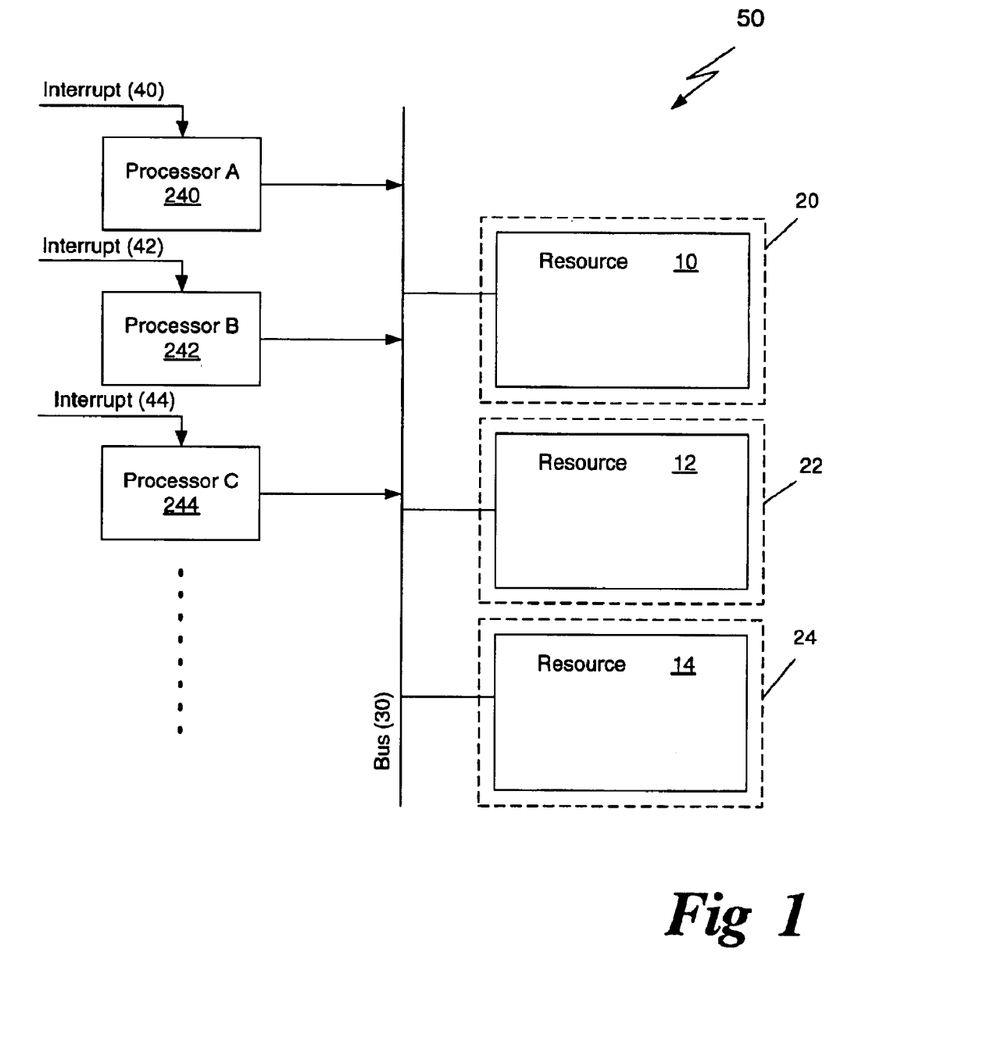
FIG. 1 shows a block diagram of a system using semaphore operations.

FIG. 1 shows a block diagram of a system that uses semaphore operations to access system resources. In the example shown in FIG. 1, the system 50 has a plurality of resources 10, 12, 14. As used herein, the term "resource" is used in the most general sense and refers to any resource accessible by a plurality of processes or processors. In one use, the processes may access the resources 10, 12, 14 one at a time, such that multiple processes do not access the same resource 10, 12, 14 simultaneously. The resources 10, 12, 14 may include, for example, scarce resources such as memory, bus lines, or input/output ports. A plurality of processors 240, 242, 244 access resources 10, 12, 14 via a system infrastructure 30. Though not shown in FIG. 1, multiple processes from a single processor 240 may seek access to the resources 10, 12, 14. In the example shown in FIG. 1, the infrastructure 30 includes a bus 30.

Semaphores 20, 22, 24 are used to control access to the system resources 10, 12, 14 and are represented by dashed boxes around the resources 10, 12, 14. While a semaphore 20 is locked and its underlying resource 10 is being used by a process or a processor 240, the processor 240 may receive an interruption 40 of the semaphore operation. As used herein, an "interruption" refers to any signal, code, or process that is capable of interrupting a semaphore operation, and in particular is not limited to the concept of an interrupt in a computer system. By way of example, an interruption 40, 42, 44 includes an asynchronous interrupt 40, 42, 44 received by a processor 240, 242, 244 and a coherency request received by a processor 240 from another processor 242. An asynchronous interrupt 40, 42, 44 refers to any interrupt that is not part of the code being executed by a the processor 240, 242, 244 whose operation is interrupted.

Interruptions 40, 42, 44, such as the asynchronous interrupt 40 shown in FIG. 1, attempt to redirect a process or a processor 240 that has locked a semaphore 20 and is performing an operation using the system resource 10. An asynchronous interrupt 40, for example, requests access to a processor 240 that may have tied up a system resource 10 with a semaphore 20 when the asynchronous interrupt 40 is received.

In use, a process or processor 240, 242, 244 requests use of a resource 10, 12, 14. If the resource 10, 12, 14 is available, the requesting processor 240 obtains the semaphore 20, 22, 24 for that resource 10, 12, 14. The semaphore 20, 22, 24 prevents other system processes from accessing the same resource 10, 12, 14 until the requesting processor 240 is done with the resource 10, 12, 14 and the semaphore 20, 22, 24 is released. During operation, an asynchronous interrupt 40 may demand access to the processor 240 that has locked a semaphore 20. This presents a problem for conventional systems because the interruption 40 may occur during the middle of processing the semaphore operation, in which case the semaphore 20 may remain locked until the asynchronous interrupt 40, 42, 44 is released and the processor 240, 242, 244 resumes and completes its semaphore operation. This prevents other processors 240, 242, 244 from using the resource 10, 12, 14 because the semaphore 20, 22, 24 has not been released. While a processor 240, 242, 244 is processing an interruption, 40, 42, 44, the resource 10, 12, 14 might not be used by the processor 240, 242, 244, but the resource 10, 12, 14 may be tied up by the semaphore 20, 22, 24, preventing other processes 240, 242, 244 from accessing the resource 10, 12, 14. The system 50 prevents such problems by delaying the interrupt 40, 42, 44 until after the semaphore 20, 22, 24 is released.

Figure 2:
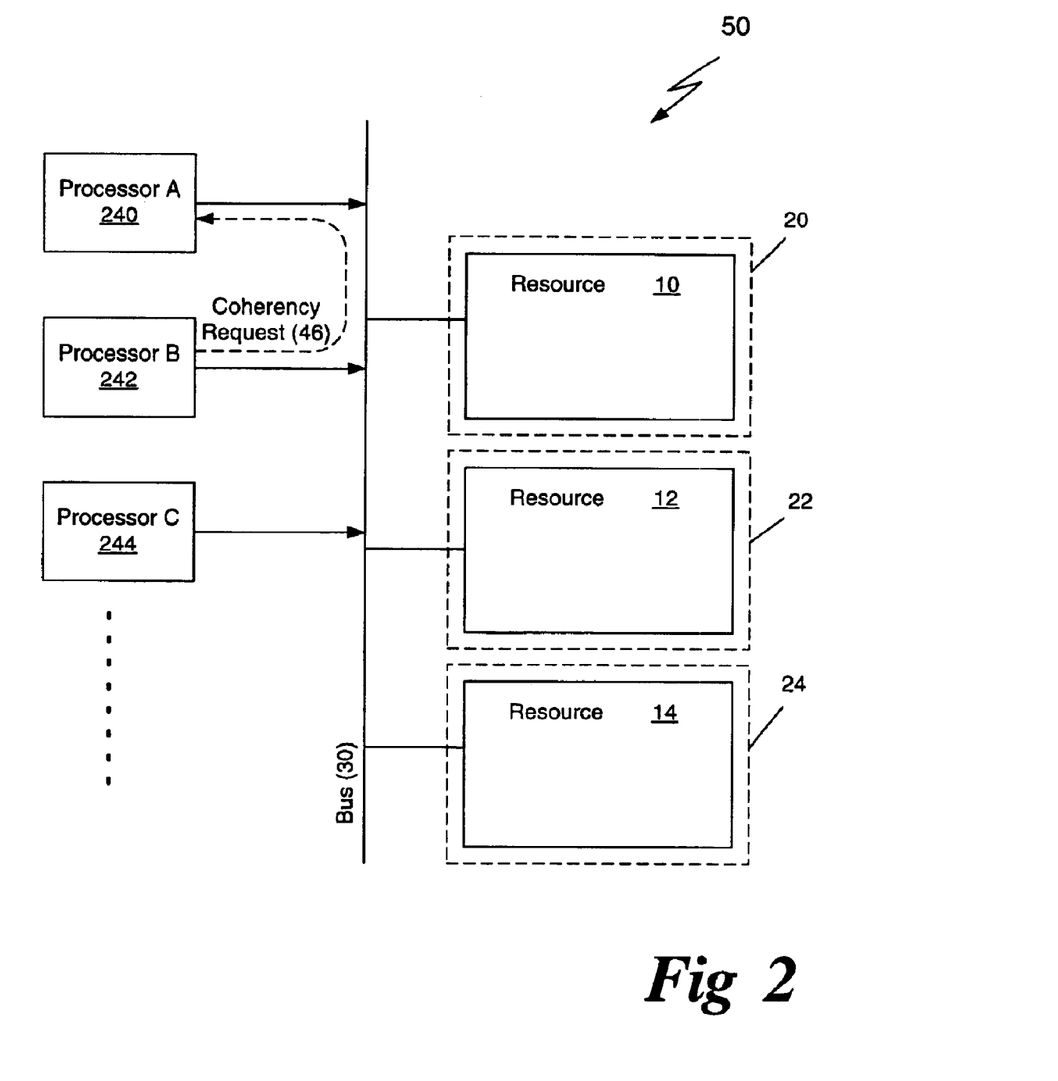
FIG. 2 shows another block diagram of a system using semaphore operations.

FIG. 2 shows another example of a system 50 on which the method is applied. In the example of FIG. 2, the interruption is a coherency request 46. A coherency request 46 refers to any request by one processor 240 to determine the availability of a system resource 10, 12, 14. In the example of FIG. 2, Processor A has locked a semaphore 20, 22, 24 for a system resource 10, 12, 14. Processor B wants access to the same resource 10, 12, 14 and sends a coherency request 46 to the infrastructure 30. The coherency request 46 determines whether a semaphore 20, 22, 24 is locked by retrieving the cache line for the semaphore 20. In the example of FIG. 2, Processor B pulls the cache line from Processor A, because Processor A has locked the semaphore 20. After retrieving the cache line, Processor B realizes that Processor A has locked the semaphore 20, 22, 24 and the resource 10, 12, 14 is not available. Then, when Processor A requires the cache line to complete the semaphore operation, it must pull the cache line from Processor B. Using the method, Processor A receives the coherency request 46 from Processor B via the infrastructure 30, but delays accepting the request 46 and providing the cache line until after the semaphore 20, 22, 24 is released. By so doing, the system 50 saves resources by not having to respond to the coherency request 46 while the semaphore operation is taking place.

Figure 3:
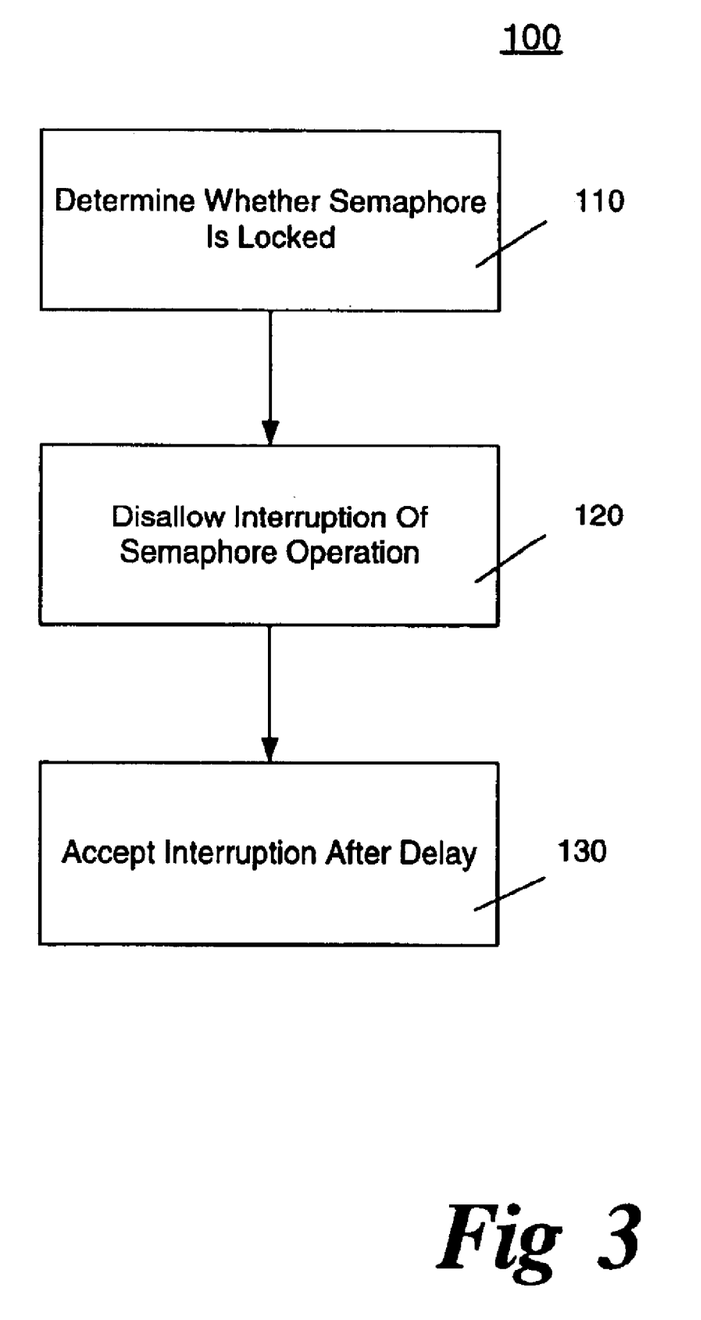
FIG. 3 shows a flow chart of the method for implementing semaphore operations.

FIG. 3 shows a flow chart of the method 100 for processing semaphore operations. The method 100 may be implemented in hardware by the processor 240 that receives an interruption 40, 42, 44, 46. The method 100 determines 110 whether the processor 240 has locked a semaphore. In one embodiment, the presence of a semaphore 20 is determined by detecting a load and clear operation indicating that a semaphore has been locked by a process. While the semaphore 20 is locked, the method 100 disallows 120 interruptions 40 of the semaphore operation by delaying recognition of the interruption 40. The interruptions 40 are logged and accepted 130 after a delay. The interruption 40 may be logged, for example, by setting a flag bit in a register. The delay helps ensure that the semaphore operation is complete and the semaphore is released before the interruption 40 is taken.

Figure 4:
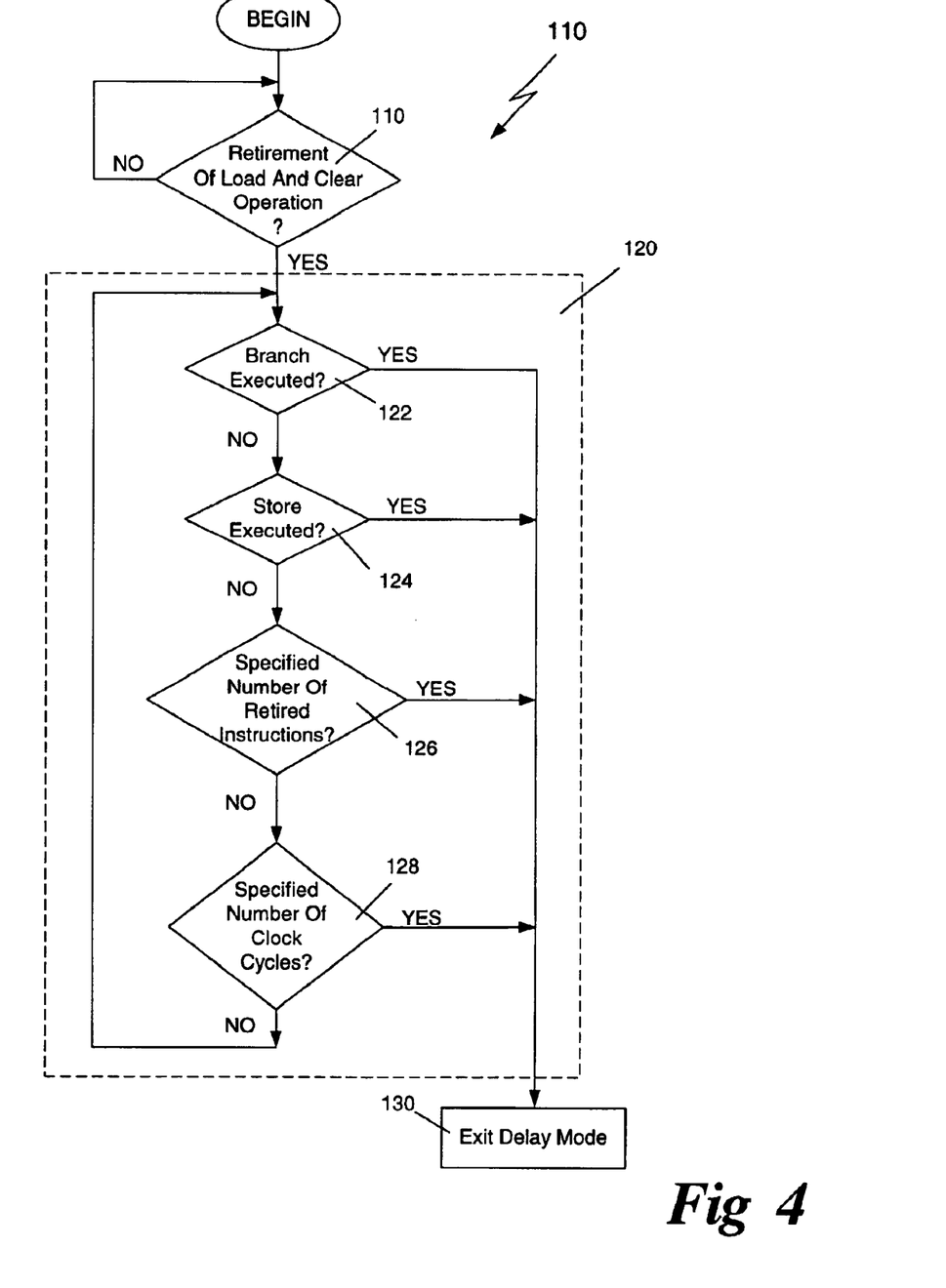
FIG. 4 shows a more detailed flow chart of the method of FIG. 1.

FIG. 4 shows a more detailed flow chart of one implementation of the method 100 shown in FIG. 3. The method 100 determines 110 whether retirement of a load and clear operation has occurred. When a load and clear operation has retired, the method 100 enters an interruption delay mode 120 that delays interruptions long enough for a semaphore operation to be completed. In the embodiment shown in FIG. 4, the occurrence of any one of four items (122, 124, 126, 128) causes the system to exit 130 delay mode and accept interruptions. The method 100 determines 122 whether a branch is executed. Branches are ordinarily not a part of the semaphore operation code, although they may be used to loop back and restart the semaphore operation. The presence of a branch indicates that the method 100 may break out of the semaphore operation by exiting 130 the delay mode and accepting the interruption. The method 100 also determines 124 whether a store instruction is executed. A store instruction indicates that semaphore macro code has been completed because semaphore code is of the general form that reads, modifies, and stores the result. Upon the occurrence of a store operation, the method 100 exits 130 the delay mode and accepts the interruption. The method 100 also determines 126 whether a specified number of instructions have been processed, and exits 130 the delay mode after they have been executed. This ensures that the method 100 will exit after a specified number of instructions without waiting indefinitely for another indication that the semaphore operation is complete. The method 100 also determines 128 whether a specified number of clock cycles have passed since the delay mode was entered 120, and exits 130 delay mode after the specified number of cycles. This likewise ensures that the method 100 does not hang up in delay mode for too long.

Figure 5:
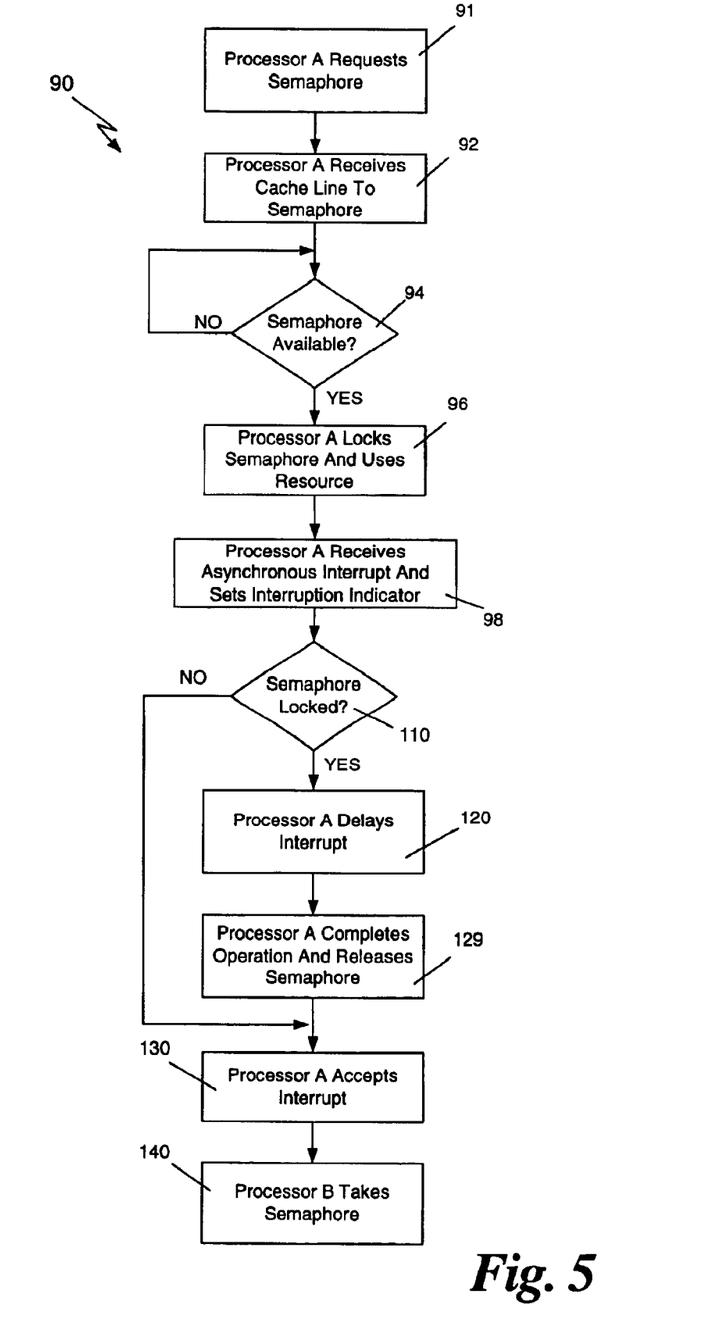
FIG. 5 shows a flow chart of one implementation of the method.

FIG. 5 shows a flow chart of one embodiment of a method 90 for using the interruption delay method 100 to process an asynchronous interrupt 40. A first processor, Processor A, requests 91 a semaphore 20 to access a system resource 10. Processor A receives 92 the cache line for the semaphore 20 and uses the cache line to determine 94 whether the semaphore 20 is available. If the semaphore 20 for the resource 10 is not available, then Processor A loops until the semaphore 20 becomes available, for example, using a delay (not shown). When the semaphore 20 is available, Processor A locks 96 the semaphore 20 and uses the resource 10. Processor A then receives 98 an asynchronous interrupt 40 requesting access to Processor A. Processor A logs the interruption 40, 42, 44, 46, for example, by setting a flag bit. The delay method 100 determines 110 whether Processor A has locked a semaphore 20. If it has not, then, it simply accepts 130 the interrupt 40. If Processor A has locked a semaphore 20, then it delays 120 the interrupt 40, and completes the semaphore operation and releases 129 the semaphore 20. Processor A then exits delay mode and accepts 130 the interrupt 40. This allows another processor, Processor B, to take 140 the semaphore 20.

Figure 6:
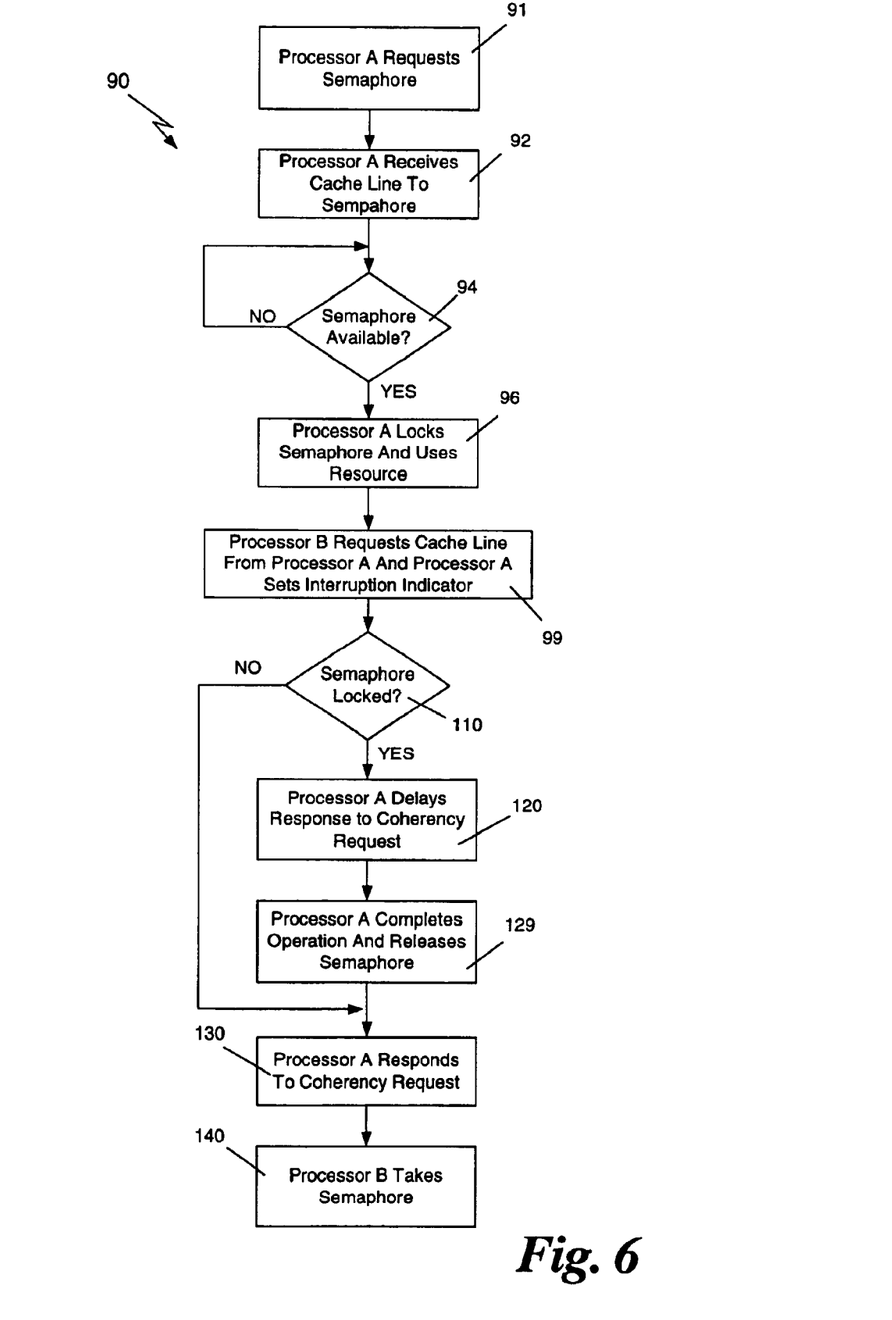
FIG. 6 shows a flow chart of another implementation of the method.

FIG. 6 shows a flow chart of another example use of the method 90 for using the interruption delay method 100, in this example, for processing a coherency request 46. After Processor A has locked 99 the semaphore 20, Processor A receives a coherency request 46 from Processor B. The coherency request 46 is logged by Processor A. The delay method 100 determines 110 whether a semaphore 20 is locked by Processor A and delays 120 a response to the coherency request 46 if a semaphore 20 is locked. Processor A then completes its semaphore operation and releases 129 the semaphore. It then exits the delay mode and responds 130 to the coherency request 46, which allows Processor B to take 140 the semaphore 20.

Figure 7:
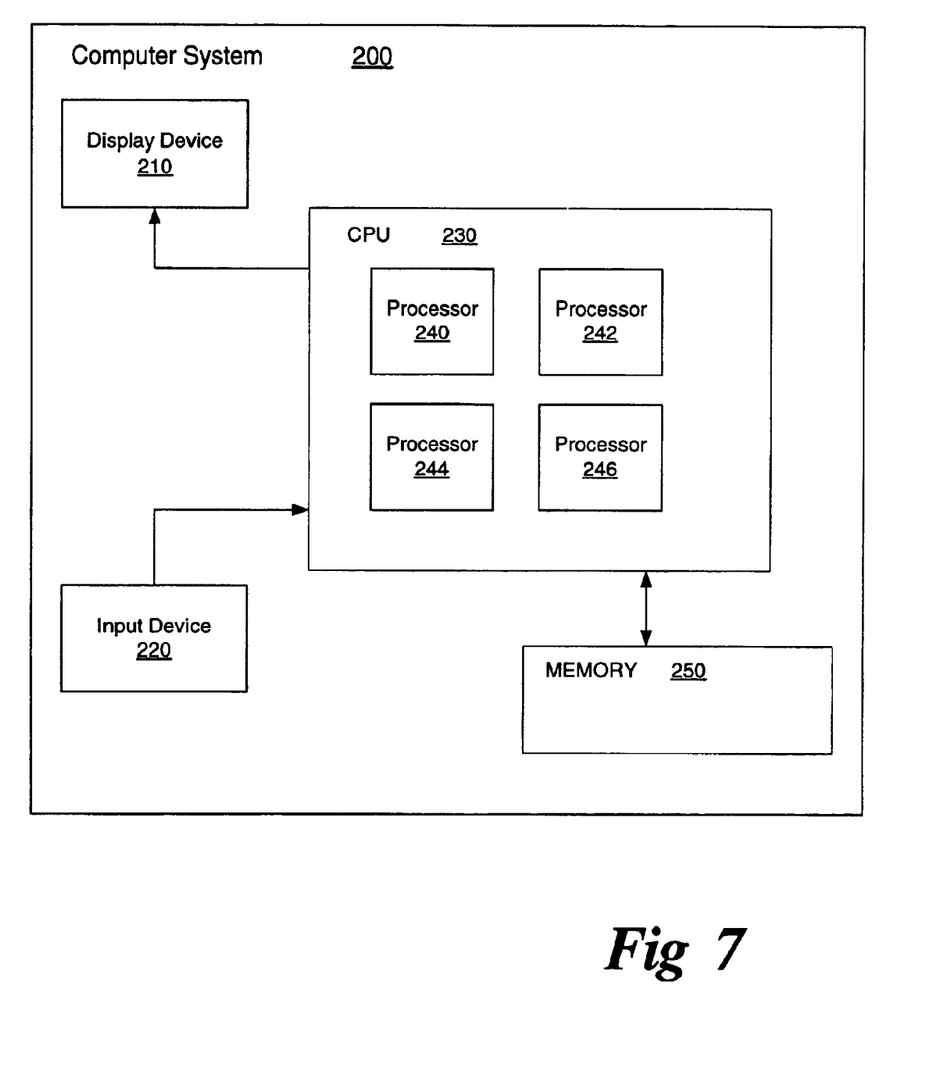
FIG. 7 shows a block diagram of a computer system on which the method may be implemented.

FIG. 7 shows a block diagram of a computer system 200 having a central processing unit (CPU) 230 connected to an input device 220 and a display device 230. The CPU 230 has a plurality of interconnected processors 240, 242, 244, 246 that access memory 250 in the computer system 200. In use, the input device 220 receives commands instructing the CPU 230 to execute instructions. The results of the analysis may be displayed on the display device 210. In processors 240, 242, 244 having multiple processes that access the same resources 10, 12, 14 using semaphores 20, the method 100 may be implemented within each of the processors 240, 242, 244 to control interruptions between processes. The method 100 may also be implemented between multiple processors 240, 242, 244 if the processors 240, 242, 244 use a common resource 10, 12, 14. For example, if locations in memory 250 shown in FIG. 7 are scarce and are accessed by each of the processors 240, then a semaphore operation may be used to control access to the memory 250. In use, an interruption 40, 42, 44, 46 may arrive from within a processor 240, 242, 244 or from an external source, seeking to interrupt a semaphore operation. The method 100 delays acceptance of the interruption 40, 42, 44, 46 until the semaphore operation is complete.

One skilled in the art will recognize that the method and system may be used wherever it is desirable to limit or control interruption of a process, and are not limited to use with semaphore operations or with interrupts or asynchronous interrupts. By way of example, the method and system may be implemented to control coherency requests relating to retrieval of data where data is being created and consumed repeatedly, at a single memory location. The coherency request may seek data from a location in memory. At the same time, a current version of the data may not even reside in the memory location, or may be incomplete. It is therefore desirable to delay responding to the coherency request until after the memory location has the correct data. A semaphore operation may be used to lock the memory location, but in one implementation, the coherency request may be able to override it and attempt to retrieve the data immediately, in much the same way that an asynchronous interrupt demands immediate use of a system resource. In this example, the method 100 may be implemented to delay the coherency request until the data is correct. If a semaphore operation is used, the method 100 may delay the coherency request until the semaphore is released, or until a specified period of time passes.

Although the present invention has been described with respect to particular embodiments thereof, variations are possible. The present invention may be embodied in specific forms without departing from the essential spirit or attributes thereof. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). It is desired that the embodiments described herein be considered in all respects illustrative and not restrictive and that reference be made to the appended claims and their equivalents for determining the scope of the invention.

What is claimed is:

1. A method of controlling interruption of a computer process using a system resource, the method comprising:

detecting use of a resource by a process;

receiving an interruption of the process;

delaying the interruption to allow the process to continue using the resource, wherein delaying comprises:
   determining whether a branch command has executed;
   determining whether a store command has executed;
   determining whether a specified number of instructions has retired; and
   determining whether a specified number of clock cycles has passed;

continue delaying the interruption until detecting that the branch command has executed, that the store command has executed, that the specified number of instructions has retired or the specified number of clock cycles has passed; and accepting the interruption after delaying the interruption.

2. The method of claim 1, wherein the detecting comprises:

detecting whether a semaphore has been locked by the process for the resource, and if the semaphore has been locked by the process for the resource, delaying interruption to allow the process to continue using the resource.

3. The method of claim 1, wherein the detecting comprises:

detecting whether a load and clear operation has retired, and if the load and clear operation has retired, delaying interruption to allow the process to continue using the resource.

4. A method of handling interruptions of a system process that has locked a semaphore for a resource, the method comprising:

determining whether a process has control over a system resource by a semaphore operation;

receiving an interruption of the process;

storing the interruption; and delaying acceptance of the interruption to provide the process additional time to use the resource, the step of delaying comprising:
   determining whether a branch command has executed;
   determining whether a store command has executed;
   determining whether a specified number of instructions has retired;
   determining whether a specified number of clock cycles has passed; and accepting the interruption only if the branch command has executed, if the store command has executed, if the specified number of instructions has retired or if a specified number of clock cycles has passed.

5. The method of claim 4, further comprising:
    detecting whether a semaphore has been locked by the process for the resource, and if the semaphore has been locked by the process for the resource, delaying interruption to allow the process to continue using the resource.

6. The method of claim 4, further comprising:
    detecting whether a load and clear operation has retired, and if the load and clear operation has retired, delaying interruption to allow the process to continue using the resource.

* * * * *